US011308396B2

(12) United States Patent
Zejda et al.

(10) Patent No.: US 11,308,396 B2
(45) Date of Patent: Apr. 19, 2022

(54) NEURAL NETWORK LAYER-BY-LAYER DEBUGGING

(71) Applicant: Amazon Technologies, Inc., Seattle, WA (US)

(72) Inventors: Jindrich Zejda, Saratoga, CA (US);
Jeffrey T. Huynh, San Jose, CA (US);
Drazen Borkovic, Los Altos, CA (US);
Se jong Oh, Sammamish, WA (US);
Ron Diamant, Santa Clara, CA (US);
Randy Renfu Huang, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 273 days.

(21) Appl. No.: 16/455,329

(22) Filed: Jun. 27, 2019

(65) Prior Publication Data

US 2020/0410354 A1    Dec. 31, 2020

(51) Int. Cl.
*G06N 3/08* (2006.01)
*G06F 9/38* (2018.01)

(52) U.S. Cl.
CPC ........... *G06N 3/082* (2013.01); *G06F 9/3861* (2013.01)

(58) Field of Classification Search
CPC ..................................................... G06N 3/082
See application file for complete search history.

(56) References Cited

U.S. PATENT DOCUMENTS

2020/0327420 A1\* 10/2020 Aralikatte ................ G06N 3/10
2020/0356905 A1\* 11/2020 Luk .......................... G06N 3/08

FOREIGN PATENT DOCUMENTS

CN    109542713    3/2019

OTHER PUBLICATIONS

Ma et al. (MODE: Automated Neural Network Model Debugging via State Differential Analysis and Input Selection, Oct. 2018, pp. 175-186) (Year: 2018).\*
Huang et al. (Design and Implementation of Convolutional Neural Network Accelerator with Variable Layer-by-layer, Jun. 2018, pp. 1-6) (Year: 2018).\*
Sun et al. (DeepConcolic: Testing and Debugging Deep Neural Networks, May 2019, pp. 111-114) (Year: 2019).\*

(Continued)

*Primary Examiner* — George Giroux
(74) *Attorney, Agent, or Firm* — Kilpatrick Townsend & Stockton LLP

(57) ABSTRACT

Techniques are disclosed for debugging a neural network execution on a target processor. A reference processor may generate a plurality of first reference tensors for the neural network. The neural network may be repeatedly reduced to produce a plurality of lengths. For each of the lengths, a compiler converts the neural network into first machine instructions, the target processor executes the first machine instructions to generate a first device tensor, and the debugger program determines whether the first device tensor matches a first reference tensor. A shortest length is identified for which the first device tensor does not match the first reference tensor. Tensor output is enabled for a lower-level intermediate representation of the shortest neural network, and the neural network is converted into second machine instructions, which are executed by the target processor to generate a second device tensor.

20 Claims, 12 Drawing Sheets

(56) References Cited

OTHER PUBLICATIONS

Huang et al., "Design and Implementation of Convolutional Neural Network Accelerator with Variable Layer-by-Layer Debugging", Proceedings of the 2018 2nd International Conference on Deep Learning Technologies, Available online at https://dl.acm.org/doi/pdf/10.1145/3234804.3234806, Jun. 27, 2018, pp. 1-6.
Application No. PCT/US2020/039872 , International Search Report and Written Opinion, dated Oct. 28, 2020, 12 pages.

* cited by examiner

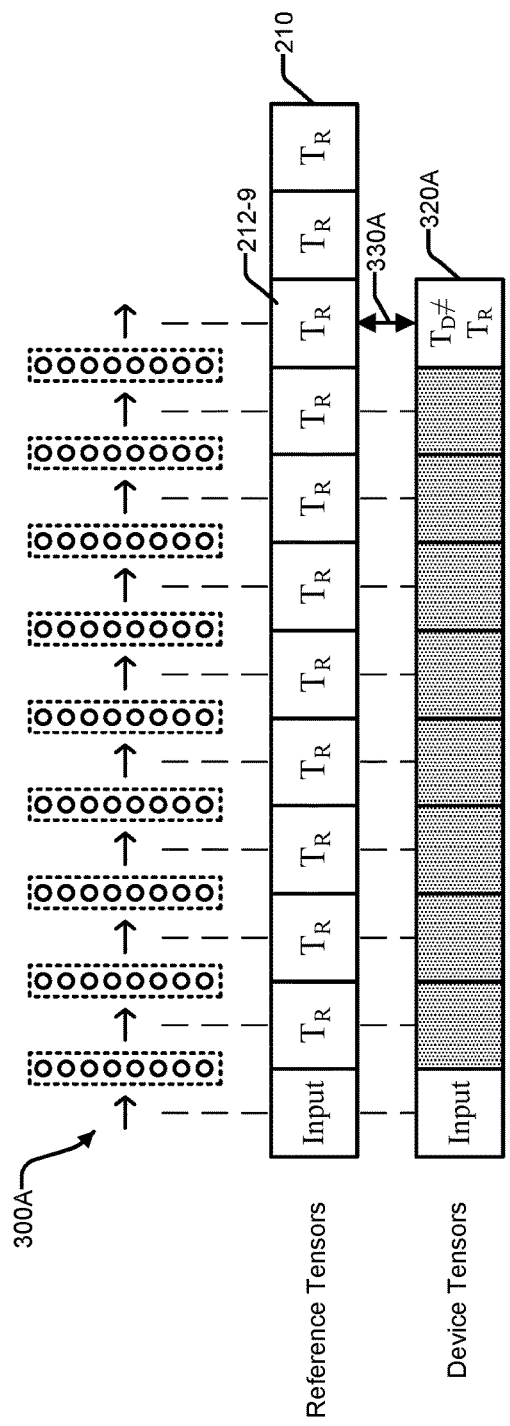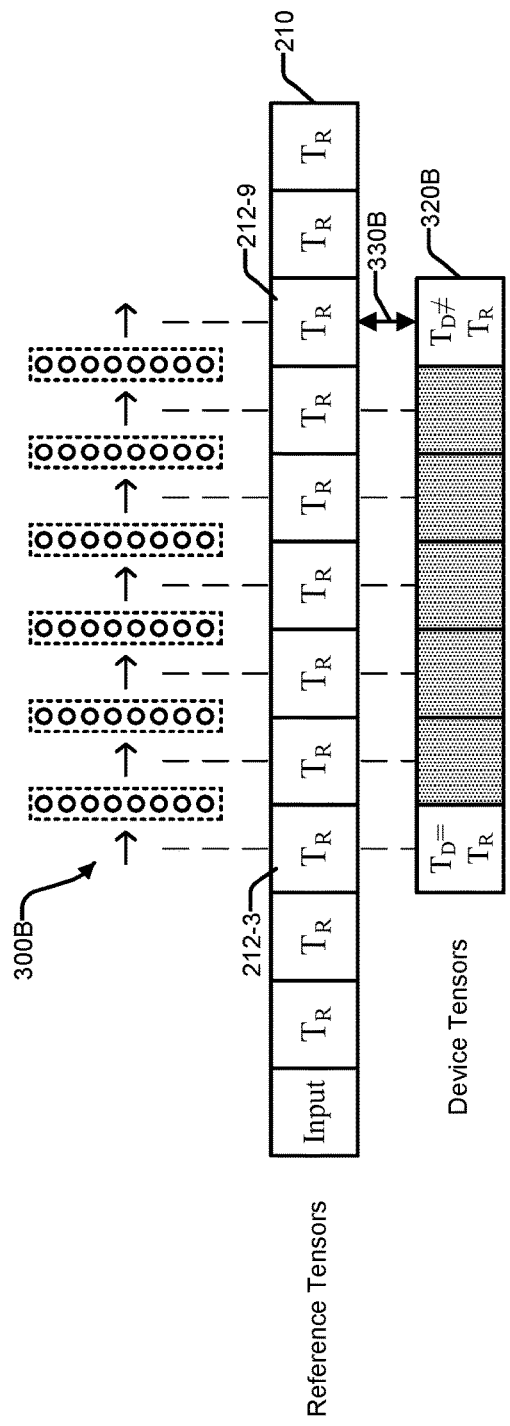
FIG. 3A
FIG. 3B

NEURAL NETWORK LAYER-BY-LAYER DEBUGGING

BACKGROUND

Debugging is an important step for improving the functionality of computing devices at the hardware or software level. As both computing devices and the software operating on them have become more complex, the debugging techniques have also expanded with more methods to detect so-called errors, bugs, or defects. Some debugging techniques include setting a breakpoint at some location within the compiled instructions so as to stop or pause an application in place while different variables and data structures associated with the application can be examined. Other techniques may cause otherwise inaccessible data to be written to memory while the application is being executed, allowing examination of the data after completion of the application. While such techniques are useful in simple systems, they provide less value for more complex hardware and software setups.

Artificial neural networks (which are referred to herein as neural networks) are computing systems with an architecture based on biological neural networks. Neural networks can be trained using training data to learn how to perform a certain task, such as identifying or classifying physical objects, activities, characters, etc., from images or videos. A neural network, such as a deep neural network, may include multiple layers of processing nodes. Each processing node in a layer can perform computations on input data generated by processing nodes in the preceding layer to generate output data. For example, a processing node may perform a set of arithmetic operations such as multiplications and additions to generate an intermediate output, or perform post-processing operations on the intermediate output to generate a final output. An artificial neural network, such as a deep neural network, may include thousands or more of processing nodes and millions or more of parameters.

Neural networks can be implemented using computer processors such as a central processing unit (CPU) to perform computations. Neural networks can also be implemented using special-purpose processors, which can include multiple processing units, such as systolic arrays, optimized for parallel, chained computations. Such special-purpose processors can perform better than general purpose processors on the same input data, in certain situations.

BRIEF DESCRIPTION OF THE DRAWINGS

Various embodiments in accordance with the present disclosure will be described with reference to the drawings, in which:

FIGS. 3A-3D illustrate example steps for reducing the length of a neural network.

FIG. 4 illustrates example steps for debugging the execution of a shortened neural network.

DETAILED DESCRIPTION

Figure 1:
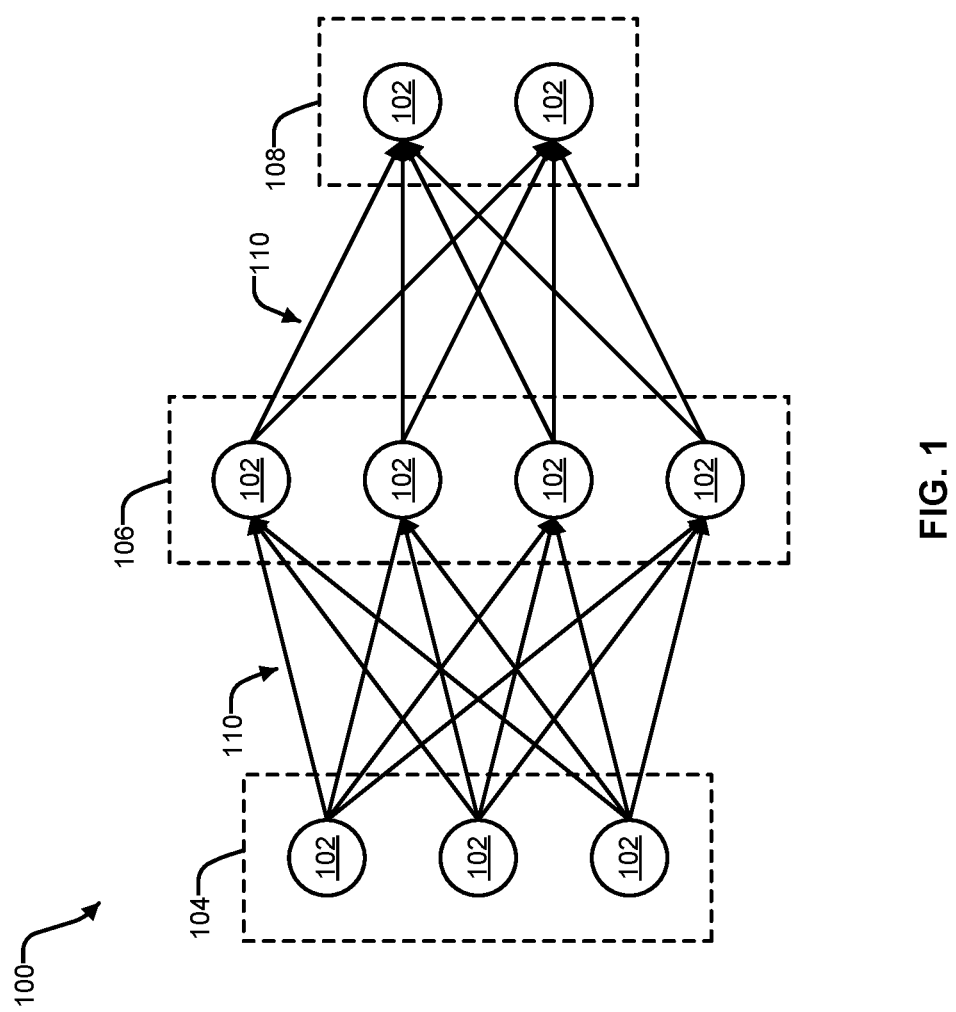
FIG. 1 illustrates an example of a computational flow model for a neural network.

During system development, debugging mismatches in the functional behavior between two systems can be a major hurdle, particularly when the two systems are fundamentally different, such as software and hardware. In many cases, the operations and computations dictated by a high-level software model can differ significantly from its hardware implementation.

Debugging the execution of a neural network on a special-purpose processor, such as one having one or more systolic arrays, is challenging for a number of reasons. One reason is that many intermediary results are not directly accessible to a debugger program. Because systolic arrays can be comprised of hundreds of individual data processing units (DPUs), it can be difficult to determine which DPU is defective when multiple DPUs are involved in the computation of a single output value. Furthermore, it can be difficult to detect a location of a precision-based summation error when each DPU output cannot be directly examined, particularly for execution of a neural network, which generally involves many parallel and sequential summations. Precision-based summation errors can occur when adding a sequence of finite precision floating point numbers. While these errors can be reduced in a model or reference computation by reordering the numbers from smallest to largest, the order in which summations are performed during execution of a neural network may be unalterable and therefore different than the reference computation.

In addition to the overall result of the neural network, intermediate outputs of the neural network can be used for debugging purposes. In order to access the intermediate outputs, the program code is usually modified and recompiled for execution. Recompiling can be time and resource intensive, especially for larger neural networks. Additionally, modification of the program code can adversely affect the performance of the original program code, in some cases changing the behavior of the neural network in ways that lead to erroneous results.

Another challenge of debugging neural network execution on special-purpose processors relates to the massive amount of computations to sort through. For example, for a single erroneous output value, there may be millions of computations that were performed over hundreds of layers and/or nodes of the neural network that contributed to the value. The sizes of the feature maps and the number of channels that may be employed increases the complexity of sorting through intermediary results. Neural networks can include many convolution operations, which are complex operations that interweave the dependencies of output values onto a vast set of input values and intermediate values.

Examples described herein address these and other issues by providing techniques for debugging a neural network execution on a special-purpose processor, referred to herein as a target processor, using a layer-by-layer approach in which the neural network is first shortened over length to reduce the compute workload and then subsequently "expanded" into multiple intermediate representations. The approach is advantageous as it allows tensor outputs at lower-level intermediate representations of the neural network to be available to the debugger program, when ordinarily such tensors would either be dissolved, split, and/or merged with other tensors. The approach also minimizes any adverse effects due to adding additional instructions to the compiled code by focusing on the specific set of layers of the neural network where the error is determined to originate.

In some examples, a debugger program receives a request to debug an execution of a neural network on a target processor. The debugger program may simulate an execution of the neural network to generate reference tensors. The reference tensors may be based on a sample input, such as a feature map. The sample input may be auto generated by the debugger program or may be provided by a user. In some examples, the reference tensors may be generated during compilation by the compiler.

After the neural network is compiled, the generated machine instructions are executed on the target processor to generate an output tensor. The output tensor is compared to a reference output tensor and a mismatch between the two may be found. Next, the neural network is repeatedly shortened by reducing the number of layers of the neural network (e.g., from 100 to 99 layers, from 99 to 98 layers, etc.). Each shortened neural network is recompiled and the generated machine instructions are re-executed by the target processor to generate new tensors ("device tensors"). Each of the device tensors are compared to a corresponding reference tensor to determine their accuracy and to determine whether the output of the shortened neural network fails. The iterative process continues until the shortest neural network whose output fails is identified.

The identified shortest (or, in some examples, "shortened") neural network is then "expanded" by enabling tensor output for lower-level intermediate representations of the neural network. This may occur during compilation by the compiler adding additional instructions into the machine instructions that cause the target processor to output device tensors for one or more lower-level intermediate representations of the shortened neural network. These device tensors may be compared to corresponding reference tensors to determine the last matching device tensor and the first mismatching device tensor. The debugger program may then identify the cause of the mismatch or computation error based on the locations of the last match and the first mismatch, the architecture of the target processor, and/or the particular intermediate representation where the mismatch was found.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a computational flow model 100 for a neural network. Neural networks take inspiration from the mechanics of the operation of the human brain. According to various models of the brain, the main computational element of the brain is the neuron. Neurons are connected together with a number of elements, with elements entering a neuron being referred to as dendrites and an element leaving a neuron being referred to as an axon. A neuron accepts signals via dendrites, performs a computation on the signals, and outputs a signal on an axon. The input and output signals are referred to as activations. The axon of one neuron can branch out and be connected to the dendrites of multiple neurons. The connection between a branch of an axon and a dendrite is called a synapse.

A synapse can scale the signal crossing the synapse. The scaling factor is referred to as a weight, and is thought of as the way a brain is able to learn: different weights result from different responses to input. Learning can change the weights, but the organization of the neurons and synapses need not change to obtain the learning. The static structure of the brain can thus be used as a model for a program, and the weights can reflect tasks that the program has learned to perform.

Neural networks operate on the notion that a neuron's computation involves a weighted sum of input values. These weighted sums correspond to the value scaling performed by the synapses and the combining of those values in the neuron. A functional operation is performed in the neuron on the combined inputs. In the brain model, the operation appears to be a non-linear function that causes the neuron to generate an output only when the inputs cross some threshold. Thus, by analogy, the nodes of a neural network can apply a non-linear function to the weighted sum of the values input into the nodes.

In the illustrated example, the model 100 includes an input layer 104, a middle layer that is often referred to as a hidden layer 106, and an output layer 108. Each layer includes some number of nodes 102. In this example, the nodes 102 of the input layer 104 are connected to each node 102 of the hidden layer 106. The connections, which would be referred to as synapses in the brain model, are referred to as weights 110. Also in this example, each node 102 of the hidden layer 106 has a connection or weight 110 with each node 102 of the output layer. The input layer 104 can receive inputs and can propagate the inputs to the hidden layer 106. A neural network implementation can include multiple hidden layers. Weighted sums computed by the hidden layer 106 (or multiple hidden layers) are propagated to the output layer 108, which can present final outputs to a user. The outputs of the nodes 102 can be referred to as activations, in keeping with the brain model.

An example of a computation that can occur at each layer in the example model 100 is as follows:

$$y_j = f\left(\sum_{i=1}^{3} W_{ij} \times x_i + b\right)$$

In the above equation, $W_{ij}$ is a weight, $x_i$ is an input activation, $y_j$ is an output activation, $f(\ )$ is a non-linear function, and b is a bias term. Various non-linear functions can be used to achieve different purposes.

The model 100 can be referred to as a directed, weighted graph. In a directed graph, each connection to or from a node indicates a direction (e.g., into the node or away from the node). In a weighted graph, each connection can have a weight. Tools for developing neural networks can visualize the neural network as a directed, weighted graph, for ease of understanding and debuggability. In some cases, these tools can also be used to train the neural network and output trained weight values. Executing the neural network is then a matter of using the weights to conduct computations on input data.

Neural networks with many layers can be capable of learning high-level features having more complexity and abstraction than shallower networks. As an example, a neural network can be taught to recognize images. In this example, pixels of an image can be fed into the input layer of the neural network, and the outputs of the first layer can indicate the presence of low-level features in the image, such as lines and edges. At subsequent layers, these features can be combined to measure the likely presence of higher level features: the lines can be combined into shapes, which can be further combined into sets of shapes. Given all this information, the neural network can output a probability that the high-level features represent a particular object or scene. For example, the neural network can output whether an image contains a cat or does not contain a cat.

The learning phase of a neural network is referred to as training the neural network. During training, the neural network is taught to perform a task. In learning the task, values for the weights (and possibly also the bias) are determined. The underlying program for the neural network (e.g., the organization of nodes into layers, the connections between the nodes of each layer, and the computation executed by each node), does not need to change during training. Once trained, the neural network can perform the task by computing a result using the weight values that were determined during training. For example, the neural network can output the probability that an image contains a particular object, can output the probability that an audio sequence contains a particular word, can generate a bounding box around an object in an image, or can propose an action that should be taken, etc. Running the program for the neural network is referred to as inference.

There are multiple ways in which weights can be trained. One method is called supervised learning. In supervised learning, all training samples are labeled, so that inputting each training sample into a neural network produces a known result. Another method is called unsupervised learning, where the training samples are not labeled and training aims to find a structure in the data or clusters in the data. Semi-supervised learning falls between supervised and unsupervised learning. In semi-supervised learning, a subset of training data is labeled. The unlabeled data can be used to define cluster boundaries and the labeled data can be used to label the clusters.

Neural networks have been used for a variety of applications, including, for example, in the areas of image and video, speech and language, medicine, game play, and robotics. In image and video, neural networks have been used for image classification, object localization and detection, image segmentation, and action recognition. In speech and language, neural networks have been used for speech recognition, machine translation, natural language processing, and audio generation. In the medical field, neural networks have been used in genomics and medical imaging. In game play, neural networks have been used to play video and board games, including games with immense numbers of possible moves such as Go. In robotics, neural networks have been used for motion planning of a robot, visual navigation, control stabilization, and driving strategies for autonomous vehicles.

Figure 2:
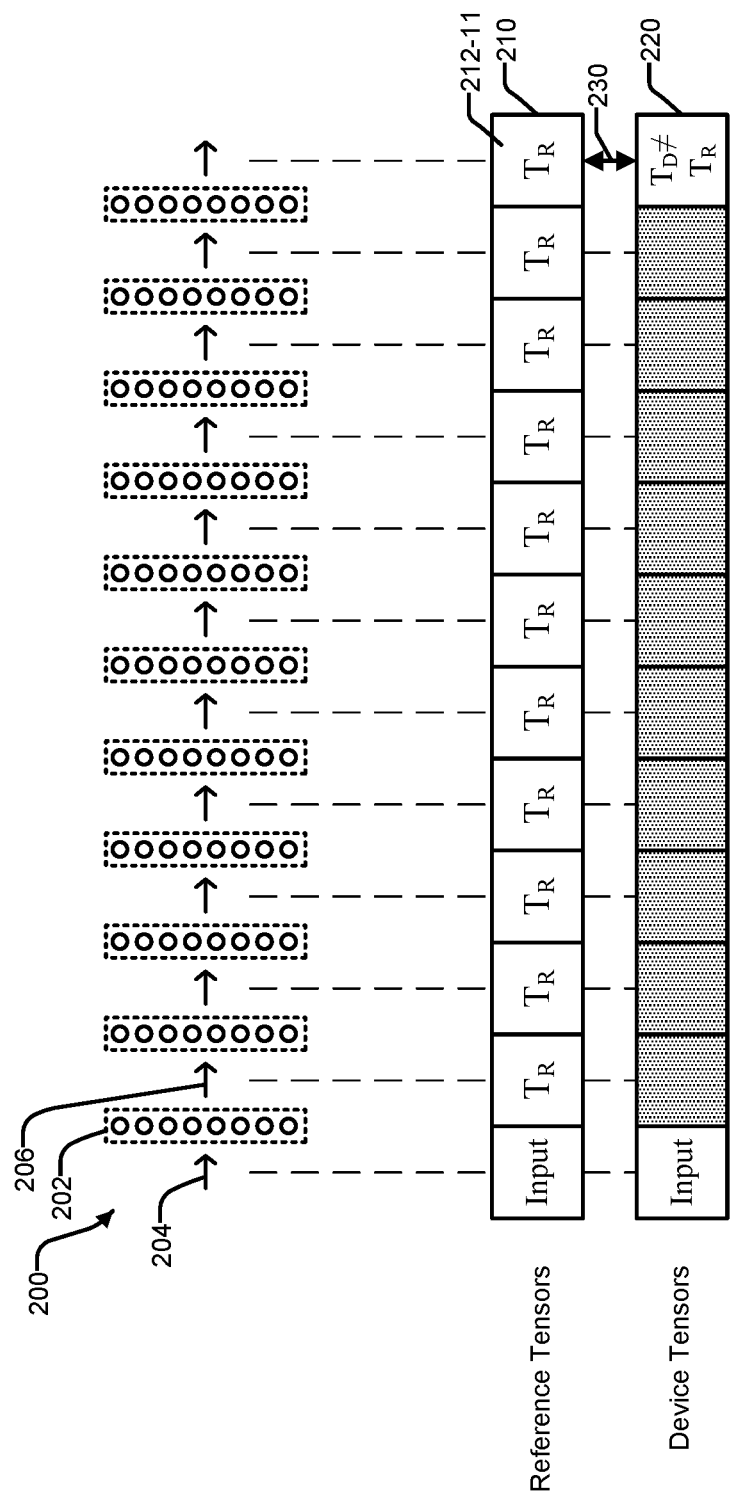
FIG. 2 illustrates an example set of reference tensors and device tensors generated for a neural network.

FIG. 2 illustrates a set of reference tensors 210 and device tensors 220 generated for a neural network 200, in accordance with some examples of the present invention. The neural network 200 includes multiple layers 202, which are shown as having simplified structures and nodes for illustrative purposes only. Each of the layers 202 may include one or more nodes that perform operations on the input data to generate the output data for the layer. A sample input 204 is provided as input to the neural network 200. The sample input 204 may be an image, a feature map, and/or one or more tensors. Each of the layers 202 may output one or more tensors 206 that are fed into the subsequent layer as an input tensor.

In some examples, the reference tensors 210 are generated by a reference processor based on the sample input 204. The operations associated with each of the layers 202 may be carried out on the reference processor with a higher or a similar precision than is afforded by the target processor. Furthermore, any modifications to the operations that are made by the compiler during compilation of the neural network 200 may be omitted when generating the reference tensors 210. Accordingly, the reference tensors 210 provide a reference against which the device tensors 220 may be compared.

In some examples, the device tensors 220 are generated by compiling the neural network 200 into machine instructions and executing the machine instructions on the target processor. In some cases, the device tensor 220 corresponding to the overall output of the neural network 200 is available, while intermediate device tensors that are overwritten during execution of the machine instructions are unavailable. After execution, the debugger program may compare the output device tensor to its corresponding reference tensor 212-11, as indicated by comparison 230. Based on the comparison 230, the debugger program may determine that the output device tensor does not match the reference tensor 212-11 (i.e., $T_D \neq T_R$) due to, for example, a difference between the output device tensor and its corresponding reference tensor exceeding an accuracy threshold (e.g., 1%, 2%, 5%, 10%, etc.). Accordingly, the debugger program may determine that the output of the neural network 200 fails.

Figure 3C:
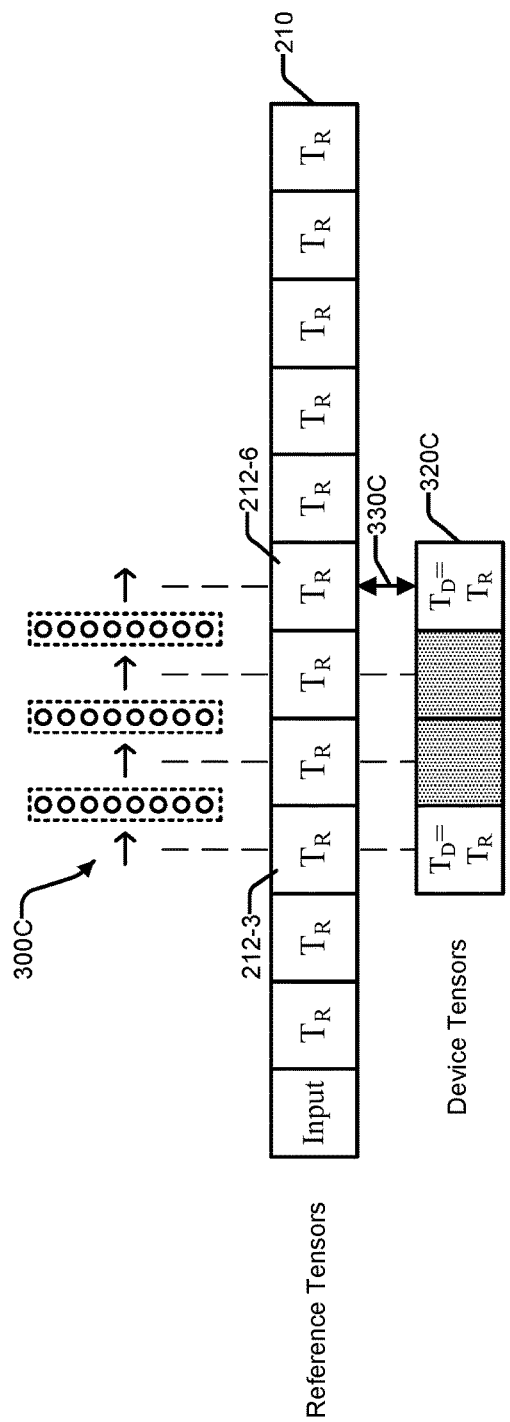

FIGS. 3A-3D illustrate example steps for reducing the length of the neural network 200. FIG. 3A illustrates device tensors 320A generated for a shortened neural network 300A, in accordance with some examples of the present invention. FIG. 3A additionally illustrates the reference tensors 210. The shortened neural network 300A is produced by removing the last two layers of the neural network 200. The input to the shortened neural network 300A is the same sample input used for the neural network 200. The shortened neural network 300A is recompiled into machine instructions by the compiler, and the machine instructions are executed by the target processor using the sample input as input to generate the device tensors 320A, which may only include an output device tensor. The debugger program compares the output device tensor to its corresponding reference tensor 212-9, as indicated by comparison 330A. Based on the comparison 330A, the debugger program may determine that the output device tensor does not match the reference tensor 212-9 (i.e., $T_D \neq T_R$) due to a difference between the output device tensor and the reference tensor 212-9 exceeding an accuracy threshold. Accordingly, the debugger program may determine that the output of the neural network 300A fails and that the neural network 300A is to be further shortened.

FIG. 3B illustrates device tensors 320B generated for a shortened neural network 300B, in accordance with some examples of the present invention. FIG. 3B additionally illustrates the reference tensors 210. The shortened neural network 300B is produced by removing the first three layers of the shortened neural network 300A. The input to the shortened neural network 300B is the reference tensor 212-3. The shortened neural network 300B is recompiled into machine instructions by the compiler, and the machine instructions are executed by the target processor using the reference tensor 212-3 as input to generate the device tensors 320B, which may only include an output device tensor. The debugger program compares the output device tensor to its corresponding reference tensor 212-9, as indicated by comparison 330B. Based on the comparison 330B, the debugger program may determine that the output device tensor does not match the reference tensor 212-9 (i.e., $T_D \neq T_R$) due to a difference between the output device tensor and the reference tensor 212-9 exceeding an accuracy threshold. Accordingly, the debugger program may determine that the output of the neural network 300B fails and that the neural network 300B is to be further shortened.

FIG. 3C illustrates device tensors 320C generated for a shortened neural network 300C, in accordance with some examples of the present invention. FIG. 3C additionally illustrates the reference tensors 210. The shortened neural network 300C is produced by removing the last three layers of the shortened neural network 300B. The input to the shortened neural network 300C is the reference tensor 212-3. The shortened neural network 300C is recompiled into machine instructions by the compiler, and the machine instructions are executed by the target processor using the reference tensor 212-3 as input to generate the device tensors 320C, which may only include an output device tensor. The debugger program compares the output device tensor to its corresponding reference tensor 212-6, as indicated by comparison 330C. Based on the comparison 330C, the debugger program may determine that the output device tensor matches the reference tensor 212-6 (i.e., $T_D = T_R$) due to a difference between the output device tensor and the reference tensor 212-6 not exceeding an accuracy threshold. Accordingly, the debugger program may determine that the output of the neural network 300C does not fail and that the length of the neural network 300C is to be increased.

Figure 3D:
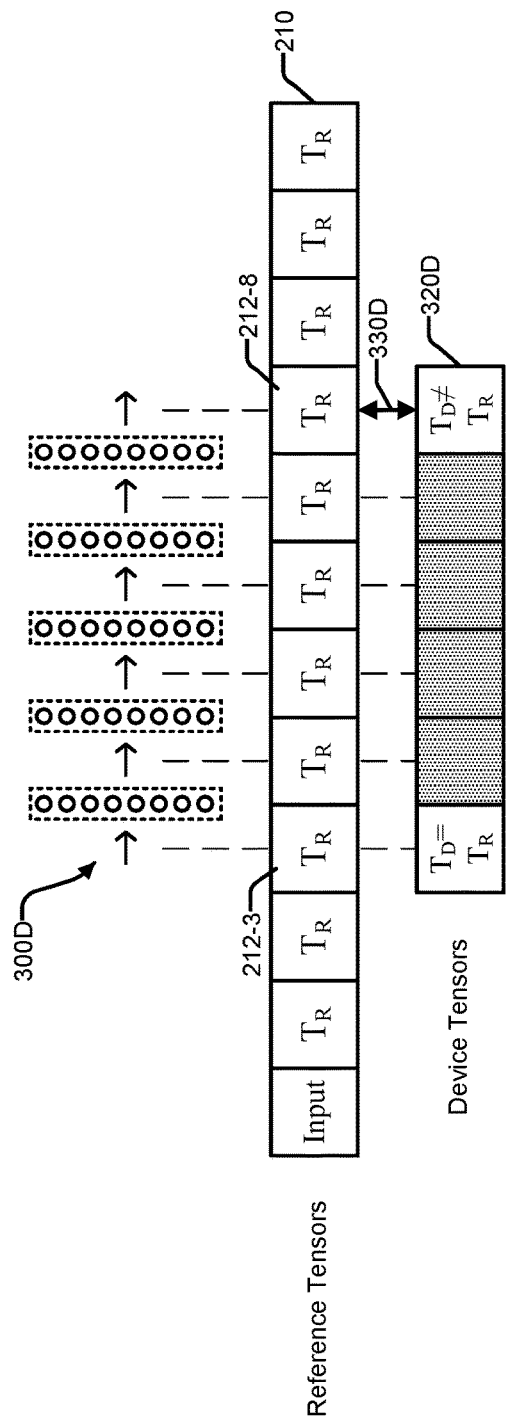

FIG. 3D illustrates device tensors 320D generated for a shortened neural network 300D, in accordance with some examples of the present invention. FIG. 3D additionally illustrates the reference tensors 210. The shortened neural network 300D is produced by removing the last layer of the shortened neural network 300B (or by adding back the last two layers to the shortened neural network 300C). The input to the shortened neural network 300D is the reference tensor 212-3. The shortened neural network 300D is recompiled into machine instructions by the compiler, and the machine instructions are executed by the target processor using the reference tensor 212-3 as input to generate the device tensors 320D, which may only include an output device tensor. The debugger program compares the output device tensor to its corresponding reference tensor 212-8, as indicated by comparison 330D. Based on the comparison 330D, the debugger program may determine that the output device tensor does not match the reference tensor 212-8 (i.e., $T_D \neq T_R$) due to a difference between the output device tensor and the reference tensor 212-8 exceeding an accuracy threshold. Accordingly, the debugger program may determine that the output of the neural network 300D fails.

As shown in reference to FIGS. 3A-3D, the layers of the neural network are repeatedly reduced until identifying the neural network having the shortest length whose output device tensor does the match its corresponding reference tensor. The neural network may be shortened or lengthened by variable amounts in order to efficiently arrive at the shortest length. For example, a binary search may be employed in which the length is halved at each iteration. In some examples, the length is decremented by 1 at each iteration until identifying the shortest length. In some examples, the length is decremented by an amount based on the extent of the mismatch with the reference tensor. For example, the length may be decremented by larger amounts when larger mismatches are found and by smaller amounts when smaller mismatches are found.

FIG. 4 illustrates example steps for debugging the execution of the shortened neural network 300D, in accordance with some examples of the present invention. In some examples, the reference tensors 410, 412, 414 are generated by a reference processor based on the sample input 404. The sample input 404 may be the same as the sample input 204 or the reference tensor 212-3 or, in some examples, the sample input 404 may be a newly generated tensor. The operations associated with each of the layers of the shortened neural network 300D may be carried out on the reference processor to generate reference tensors 410. Alternatively or additionally, the reference tensors 412, 414 may be generated for various intermediate representations 440 of the shortened neural network 300D. The intermediate representations 440 may include the high-level intermediate representation at which the reference tensors 410 are generated, as well as a first lower-level intermediate representation at which the reference tensors 412 are generated and a second lower-level intermediate representation at which the reference tensors 414 are generated.

The intermediate representations 440 may represent the different representations that the neural network passes through while the compiler converts the program code, generally written using a high-level programming language, into machine instructions that are executable by the target processor. Lower-level intermediate representations may take into consideration the specific configuration of the target processor, and may therefore include additional details and additional operations compared to higher-level intermediate representations. In one example, converting from a high-level intermediate representation to a lower-level intermediate representation may include converting linear text representing the neural network into an intermediate graph structure that allows flow analysis and operation reordering. Additional intermediate representations may include, but are not limited to: a parsed intermediate representation, a compute operation scheduler intermediate representation, a resource allocation intermediate representation, a scheduler intermediate representation, a code generator intermediate representation, a synchronization intermediate representation, machine code for one or more execution engines, runtime updates to the machine code, and the like.

In some examples, device tensors 420, 422, 424 are generated by enabling tensor output for the intermediate representations 440 when the shortened neural network 300D is converted into machine instructions. In some examples, this is accomplished by the compiler inserting additional instructions into the machine instructions that cause the target processor to output the tensors during execution. The additional instructions may include save operations. For example, the save operations can be introduced by inserting nodes into a data flow graph, where the data flow graph is generated based on the original program code. After inserting these additional nodes, the data flow graph can be converted into machine instructions, in the same manner as would be performed if the data flow graph had not been augmented with additional nodes.

After the shortened neural network 300D is compiled into machine instructions, the machine instructions are executed on the target processor, causing device tensors 420, 422, 424 to be generated. At each intermediate representation, the debugger program may compare device tensors to their corresponding reference tensors to find the last matching tensor and the first mismatching tensor ("match-mismatch pair") at each intermediate representation. For example, the debugger program may identify device tensors 423 for the first lower-level intermediate representation and device tensors 425 for the second lower-level intermediate representation. The debugger program may notify the user of the found match-mismatch pairs and the corresponding computations at each of the intermediate representations.

Figure 5:
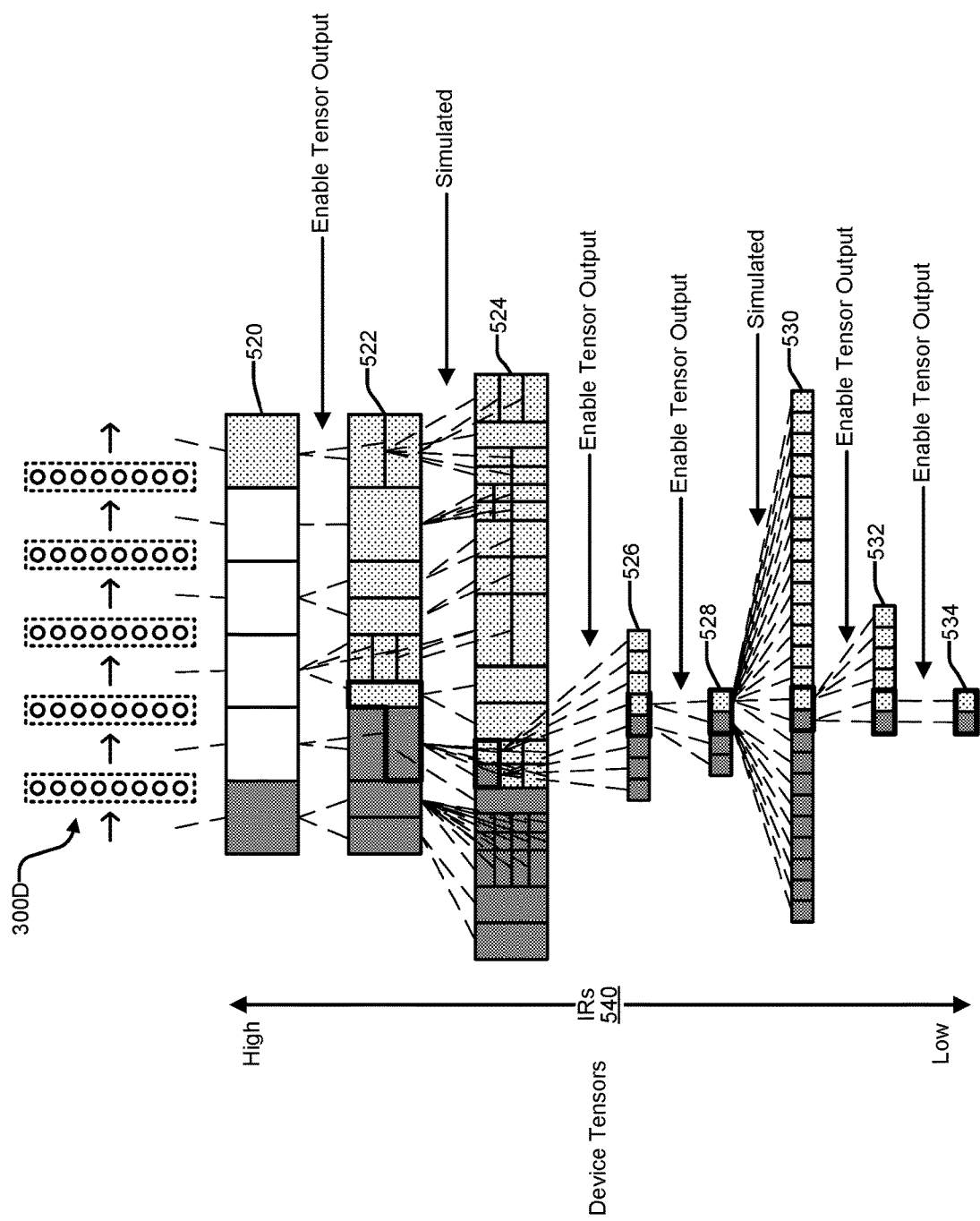
FIG. 5 illustrates example steps for debugging the execution of a shortened neural network.

FIG. 5 illustrates example steps for debugging the execution of the shortened neural network 300D, in accordance with some examples of the present invention. In the illustrated example, tensor output is sequentially enabled for each of the intermediate representations 540 based on the identified match-mismatch pair (indicated by a darkened rectangular box or container) for the previous (higher-level) intermediate representation. The shortened neural network 300D may be recompiled after the match-mismatch pair is identified for a particular intermediate representation, allowing the tensor output to be enabled over a localized set of operations that are directly related to the match-mismatch pair for the previous intermediate representation. Alternatively, as shown by the transition from the device tensors 522 to the device tensors 524, all tensors may be computed for a lower intermediate representation, regardless of an identified match-mismatch pair. Corresponding reference tensors are generated for the device tensors at each of the intermediate representations 540, optionally also based on the identified match-mismatch pairs.

In the illustrated example, tensor output is enabled during compilation for all operations such that the device tensors 520 are generated during execution of the compiled machine instructions. For the next lower-level intermediate representation, the tensor output is enabled during recompilation for all operations such that the device tensors 522 are generated during reexecution of the compiled machine instructions. For the next lower-level intermediate representation, the device tensors 524 are simulated, by the reference processor, due to tensor output being unavailable. The device tensors 524 may be directly related to the match-mismatch pair identified in the device tensors 522. As shown by the transition from the device tensors 522 to the device tensors 524, tensors can be broken into smaller subtensors (also called tiles) in lower-level intermediate representations. A lower-level intermediate representation can also merge tensors or, in some rare cases, tensors become slightly larger. For the next lower-level intermediate representation, the tensor output is enabled during recompilation for only operations directly related to the match-mismatch pair identified in the device tensors 524 such that the device tensors 526 are generated during reexecution of the compiled machine instructions.

For the next lower-level intermediate representation, the tensor output is enabled during recompilation for only operations directly related to the match-mismatch pair identified in the device tensors 526 such that the device tensors 528 are generated during reexecution of the compiled machine instructions. For the next lower-level intermediate representation, the device tensors 530 are simulated, by the reference processor, due to tensor output being unavailable. The device tensors 530 may be directly related to the match-mismatch pair identified in the device tensors 528. For the next lower-level intermediate representation, the tensor output is enabled during recompilation for only operations directly related to the match-mismatch pair identified in the device tensors 530 such that the device tensors 532 are generated during reexecution of the compiled machine instructions. For the next lower-level intermediate representation, the tensor output is enabled during recompilation for only operations directly related to the match-mismatch pair identified in the device tensors 532 such that the device tensors 534 are generated during reexecution of the compiled machine instructions.

Figure 6A:
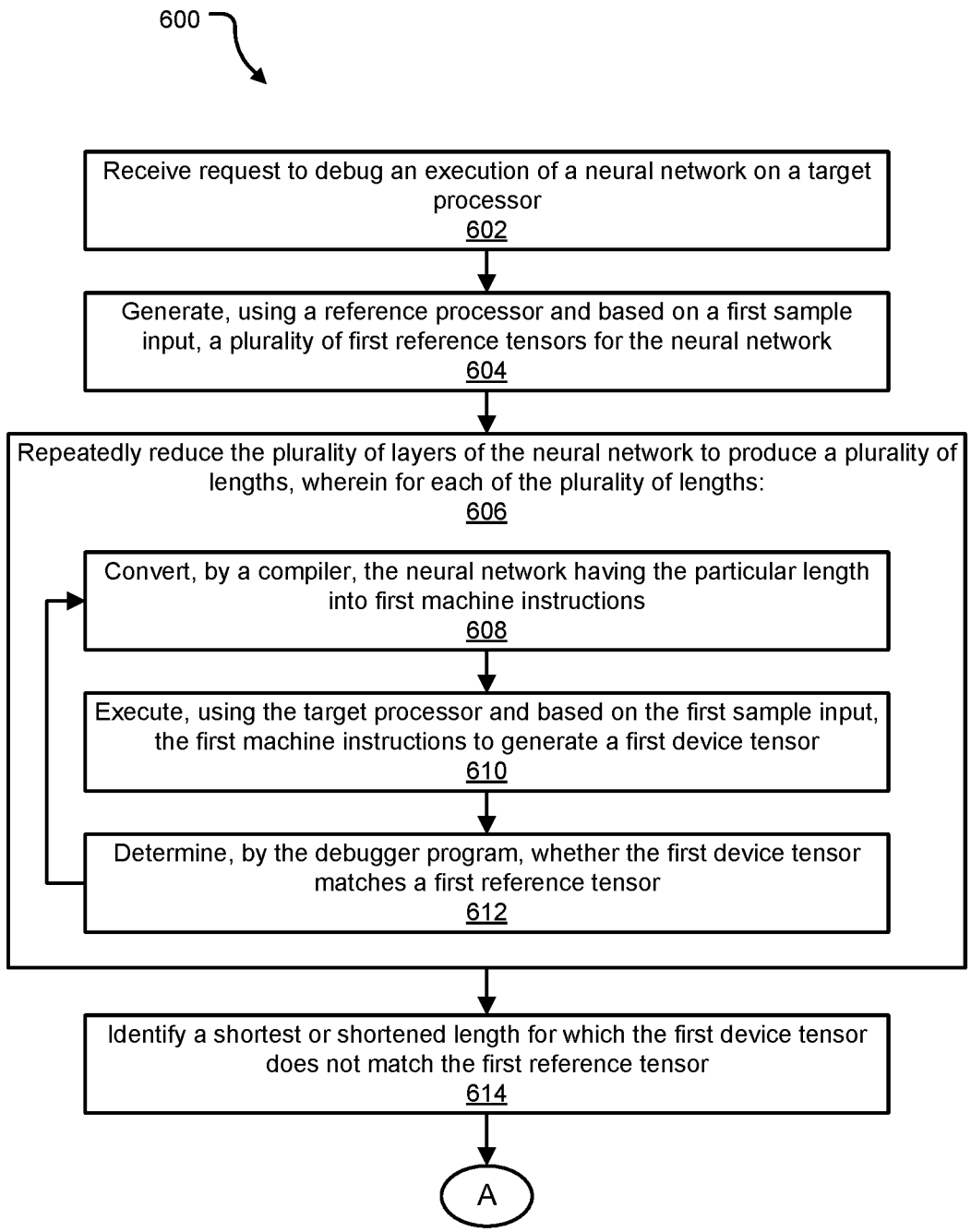
FIGS. 6A and 6B illustrate an example of a method for debugging a neural network execution on a target processor.
Figure 6B:
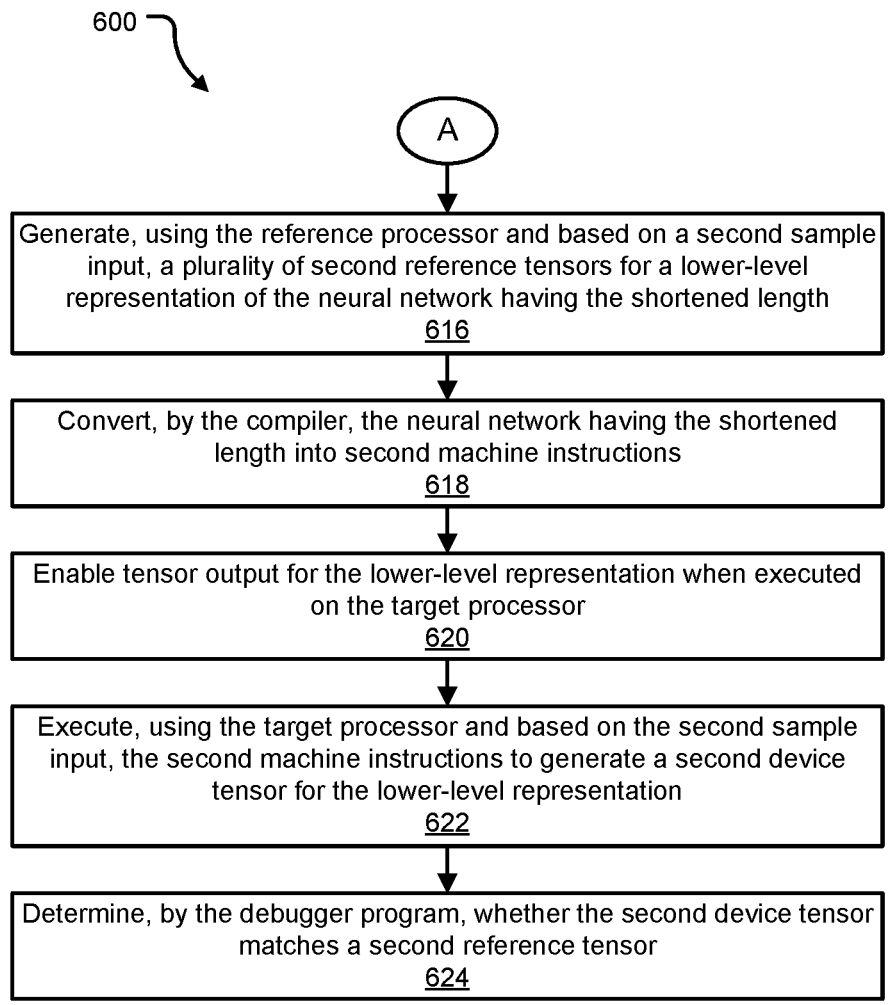

FIGS. 6A and 6B illustrate an example of a method 600 for debugging a neural network execution on a target processor. One or more steps of the method 600 may be performed in a different order than the illustrated example, and one or more steps of the method 600 may be omitted during performance of the method 600.

At step 602, a request to debug an execution of a neural network on the target processor is received. In some examples, the request is received by a debugger program operating on a host system. In some examples, the request indicates a neural network and/or the target processor. For example, the request may indicate where program code for the neural network is stored. In some examples, the neural network includes a plurality of layers. Each of the plurality of layers may include one or more operations.

At step 604, a plurality of first reference tensors for the neural network are generated based on a first sample input. In some examples, the plurality of first reference tensors are generated using a reference processor that is different than the target processor. In some examples, the plurality of first reference tensors are generated and/or received by the debugger program. For example, the debugger program may simulate an execution of the neural network to generate the first reference tensors. In some examples, the first reference tensors are generated by the compiler during compilation.

At step 606, the plurality of layers of the neural network are repeatedly reduced to produce a plurality of lengths of the neural network. For each particular length of the plurality of lengths, steps 608 to 612 are performed. The neural network may be shortened by variable amounts in order to efficiently arrive at the shortest neural network whose output fails. In some examples, the neural network is shortened by a single layer at each iteration. In some examples, the neural network is shortened by two or more layers at each iteration. To arrive at the shortest neural network whose output fails, a binary search may be employed in which the length is halved at each iteration. If a shortened neural network is arrived at whose output does not fail, the neural network may be lengthened by adding back layers that were previously removed, as described in reference to FIGS. 3A-3D.

At step 608, the neural network having the particular length is converted (or compiled) into first machine instructions. In some examples, the neural network having the particular length is converted by the compiler. In some examples, the compiler is operating on the host system.

At step 610, the first machine instructions are executed using the target processor to generate a first device tensor. In some examples, the first machine instructions are executed based on the first sample input or on one of the plurality of first reference tensors.

At step 612, it is determined whether the first device tensor matches a first reference tensor of the plurality of first reference tensors. The first reference tensor may be the reference tensor of the plurality of first reference tensors that corresponds to the first device tensor. In some examples, the debugger program determines whether the first device tensor matches the first reference tensor. In some examples, the two tensors match if a difference between them does not exceed an accuracy threshold.

At step 614, a shortened length of the plurality of lengths for which the first device tensor does not match the first reference tensor is identified. In some examples, a shortest length of the plurality of lengths for which the first device tensor does not match the first reference tensor is identified. In some examples, step 614 is performed by the debugger program.

At step 616, a plurality of second reference tensors for a lower-level representation of the neural network are generated based on a second sample input. The second sample input may be different than or the same as the first sample input. In some examples, the plurality of second reference tensors are generated using the reference processor. In some examples, the lower-level representation of the neural network is an intermediate representation of the neural network that is lower than the highest level intermediate representation (e.g., program code) and higher than the lowest level intermediate representation (e.g., machine instructions). In some examples, the plurality of second reference tensors are generated by the debugger program. For example, the debugger program may simulate an execution of the neural network to generate the second reference tensors. In some examples, the second reference tensors are generated by the compiler during compilation.

At step 618, the neural network having the shortened length is converted (or compiled) into second machine instructions. In some examples, the neural network having the shortened length is converted by the compiler.

At step 620, tensor output for the lower-level representation is enabled for when the second machine instructions are executed by the target processor. In some examples, during compilation, the compiler adds additional instructions into the second machine instructions that cause tensor output for the lower-level representation. For example, one or more of the additional instructions may correspond to a save operation. In some examples, the additional instructions may further enable tensor output for multiple lower-level representations.

At step 622, the second machine instructions are executed using the target processor to generate a second device tensor for the lower-level representation. In some examples, the second machine instructions are executed based on the second sample input or on one of the plurality of second reference tensors. For examples in which the additional instructions enable tensor output for multiple lower-level representations, executing the second machine instructions may cause a third device tensor for a second lower-level representation of the neural network to be generated. In such examples, the lower-level representation may be a first lower-level representation.

At step 624, it is determined whether the second device tensor matches a second reference tensor of the plurality of second reference tensors. The second reference tensor may be the reference tensor of the plurality of second reference tensors that corresponds to the second device tensor. In some examples, the debugger program determines whether the second device tensor matches the second reference tensor. In some examples, the two tensors match if a difference between them does not exceed an accuracy threshold. For examples in which the additional instructions enable tensor output for a second lower-level representation of the neural network causing generation of a third device tensor, it may also be determined whether the third device tensor matches a third reference tensor of the plurality of second reference tensors.

Figure 7:
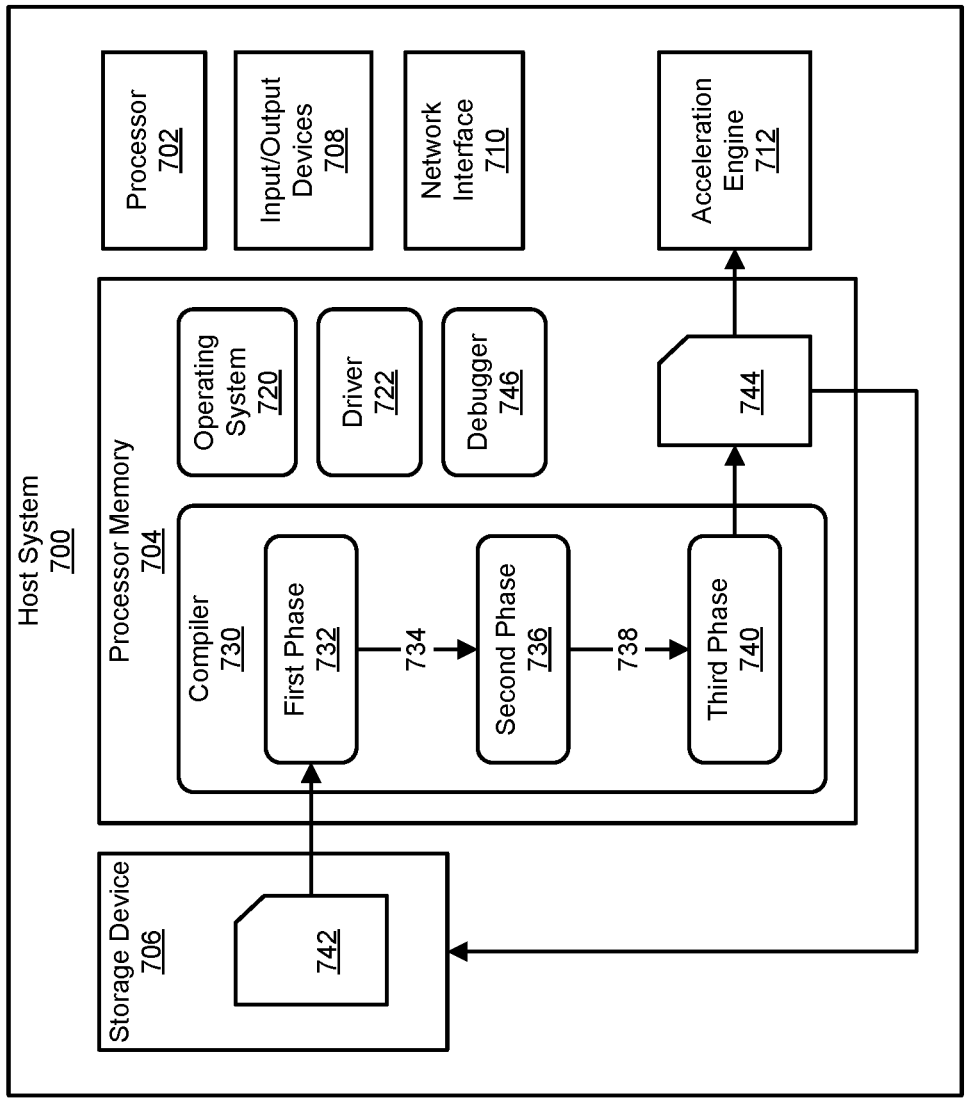
FIG. 7 includes a block diagram that illustrates an example of a host system.

FIG. 7 includes a block diagram illustrating an example of a host system 700 on which a compiler 730 and a debugger 746, such as is described herein, can run. The illustrated host system 700 is an example of a computing device, and includes a processor 702, a processor memory 704, at least one storage device 706, various Input/Output (I/O) devices 708, and at least one network interface 710. In the example of FIG. 7, the host system 700 also includes an acceleration engine 712, which is an integrated circuit device that can accelerate certain operations or computations performed by the host system 700. In various examples, the host system 700 can be implemented as a server in a data center, a desktop computer, a laptop computer, a tablet computer, or a smartphone, among other examples. In some examples, operations or components discussed below as performed or included in the host system 700 can be performed or included in other computer devices. For example, the compiler 730 can execute on the host system 700 while the acceleration engine 712 is located at a different host system.

The processor 702 is an integrated circuit device that can execute program code, in the form of instructions. The program code can be for various software applications or tools, such as an operating system 720, the debugger 746, or the compiler 730. While the processor 702 is executing a program, the instructions for the program can be stored in the processor memory 704. The instructions can also be stored elsewhere, such as on the storage device 706, and can be loaded into the processor memory 704 when needed by the processor 702. The processor 702 can also use the processor memory 704 for temporary storage of other data on which the processor 702 is operating. In various examples, the processor memory 704 is a volatile memory type, such as a type of Random Access Memory, though non-volatile memory types can, alternatively or additionally, be used for the processor memory 704.

The storage device 706 is an example of a device that can include non-volatile memory. For example, the storage device 706 can be a magnetic disk drive, a solid state drive, or an optical drive, among other examples. The storage device 706 can further be non-transitory, such that program code and other data stored on the storage device 706 remains present when the storage device 706 is not powered on.

The storage device 706 is one example of a peripheral device, which are components that can be coupled to the host system 700 to add functionality to the host system 700. Other examples of peripheral devices include the Input/Output devices 708 and the network interface 710. The Input/Output devices 708 can include user input and output devices, such as keyboards, mice, touch screens, microphones, display screens, speakers, printers, and scanners, among other examples. The network interface 710, which can be implemented using a network interface card, can provide access to one or more networks. The network interface 710 can include, for example, a physical port for connecting a network cable and/or wireless antennas for communicating with Wi-Fi and/or cellular networks. The network interface 710 can also be described as an I/O device.

The acceleration engine 712 is also another type of peripheral device or I/O device. The acceleration engine 712 is a device that is purpose built to perform certain operations that can be performed by the processor 702, but can be performed faster by the acceleration engine 712. For example, the acceleration engine 712 can be a neural network accelerator, and, as such, may be able to perform the large scale, parallel computations of a neural network more efficiently than when the computations are performed by the processor 702. As another example, the acceleration engine 712 can be a graphics processing unit (GPU), and may be optimized to perform the computations needed for graphics rendering. Other examples of devices that can be implemented by the acceleration engine 712 include cryptographic accelerators, compression and decompression accelerators, 3-D accelerators, regular expression accelerators, security accelerators, and others.

In various examples, the acceleration engine 712 can execute program code to perform certain operations. For example, when the acceleration engine 712 is a neural network accelerator, the acceleration engine 712 can be programmed to execute a particular neural network, such as one that performs image recognition or one that performs machine translation. As a further example, to support the execution of a neural network, the acceleration engine 712 can be programmed to perform operations such as copying data for the neural network from processor memory 704 (for example) into the acceleration engine 712, copying input data for the neural network from processor memory 704 into the acceleration engine 712, and/or copying results from the acceleration engine 712 into the processor memory 704, among other examples.

To generate program code for the acceleration engine 712, in various examples, the host system 700 can execute the compiler 730. Compilers, in general, are software programs that translate program code written in a human-readable language into a format (e.g., machine instructions) that can be read and processed by an integrated circuit device. In the example of FIG. 7, the acceleration engine 712 is a neural network accelerator and the compiler 730 is for compiling a neural network description into instructions to be executed by the acceleration engine 712. When the acceleration engine 712 implements a different type of accelerator, another compiler can be used.

The compiler 730 can be activated, for example, when the operating system 720 receives keyboard, mouse, touch-screen, voice commands, or other inputs from the Input/Output devices 708. The inputs can further include parameters for the compiler 730, such as the input code 742 to compile and configuration options for the compilation process. Once the compiler 730 is activated, the processor 702 can load the instructions for the compiler 730 into the processor memory 704, and can execute the instructions.

In the example of FIG. 7, the compiler 730 includes a first stage 732, a second stage 736, and a third stage 740, which each perform different operations to produce compiled code 744. In other examples, the compiler 730 can combine the operations of the first stage 732, second stage 736, and/or third stage 740 into fewer stages, or can divide the operations of one of the stages into multiple stages.

The first stage 732 can receive and process input code 742. The input code 742 can describe a program in a high-level programming language, such as Java, C++, or Tensorflow, among many other examples. The input code 742 can describe, for example, steps to perform image recognition, speech recognition, machine translation, or other operations. The input code 742 can be obtained, for example, from the storage device 706. Alternatively, though not illustrated here, the input code 742 may be located in the processor memory 704 or can be obtained from a network location, using the network interface 710. Processing of the input code 742 can include sorting the operations described in the input code 742 into layers, where the outputs of one layer provide the inputs to a next layer. Processing can also include identifying steps to be performed by the processor 702, rather than by the acceleration engine 712. For example, the processor 702, through the execution of a driver 722, may need to perform steps such as configuring Direct Memory Access (DMA) descriptors for moving data into or out of the acceleration engine 712, among other examples.

The output 734 of the first stage 732 can be organized, for example, in the layers, nodes, and connections between nodes of a neural network. The second stage 736 can perform intermediate processing on this output 734. For example, the operations performed in any one layer, or at any one node in a layer, may be too many for the acceleration engine 712 to perform at the same time. The acceleration engine 712 may, for example, have a limited amount of locale storage space for the data needed for a computation, or the computations may be more than the acceleration engine 712 can perform at one time. In this example, the first stage 732 can break the operations of the layer or node down into smaller operations, which can fit into the acceleration engine's local memory and/or can fit into the computing capacity of the acceleration engine 712. Processing of the output 734 of the first stage 732 can include other steps, such as scheduling, or determining the order in which the acceleration engine 712 and/or processor 702 will perform operations, among other examples.

In various examples, the output 738 of the second stage 736 includes the various steps to be performed by components of the acceleration engine 712, in the order that the steps are to be performed. The output 738 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 740 can operate on the output 738 of the second stage 736, and perform various steps before producing the instructions that are to be executed by the acceleration engine 712. These steps can include, for example, removing redundant dependencies, resolving or handling dependencies between nodes by inserting synchronization instructions into the code, identifying possibly optimizations in memory usage or memory bandwidth usage, and other operations.

The output of the third stage 740 is compiled code 744, which may include machine instructions in binary format. In some examples, the compiled code 744 can be stored in the processor memory 704. Alternatively or additionally, the compiled code 744 can be copied to the storage device 706 or to a network location. As noted above, the acceleration engine 712 may be located at a different host system, in which case the compiled code 744 can be sent over the network interface 710 to the other host system.

In the example of FIG. 7, the host system 700 can be executing a driver 722, which can also be referred to as a device driver or runtime driver, that manages the acceleration engine 712. The driver 722 can provide an interface between applications executing on the host system 700 (or on another host system) and the acceleration engine 712. For example, the driver 722 can provide an Application Program Interface (API) that defines functions for feeding input data to the acceleration engine 712 and defining the operation to perform on the input data. In this and other examples, the driver 722 can configure the acceleration engine 712 to perform the operation. For example, the driver 722 can identify a neural network that the acceleration engine 712 is to execute, as well as the location in the processor memory 704 or on the storage device 706 where the compiled code 744 for the neural network is located. The driver 722 can further load into the acceleration engine 712 or cause the acceleration engine 712 to load the compiled code 744, can load or cause the acceleration engine 712 to load the input data on which the neural network is to operate, and/or can cause the acceleration engine 712 to being executing on the input data. Once the acceleration engine 712 has finished, the acceleration engine 712 can notify the driver 722, and the driver 722 can deliver a result back to the application that requested the result.

In some embodiments, the host system 700 can execute a debugger 746, which is an application that can be used to debug, examine, and/or improve the functionality of the neural network. The debugger 746 may allow a user to examine the inputs and outputs of different layers and nodes of the neural network by setting breakpoints in the compiled code 744. A breakpoint is a point at which executing code will halt further execution, with all execution state prior to the breakpoint being preserved. In various examples, a breakpoint can be assigned to a specific instruction, a particular function call, a program counter value, or an otherwise-identified part of a program's code. Once a breakpoint is reached, the debugger can enable a user to see the current values of variables, the current contents of system memory, and/or to step through the program code one or multiple instructions at a time, among other operations.

Figure 8:
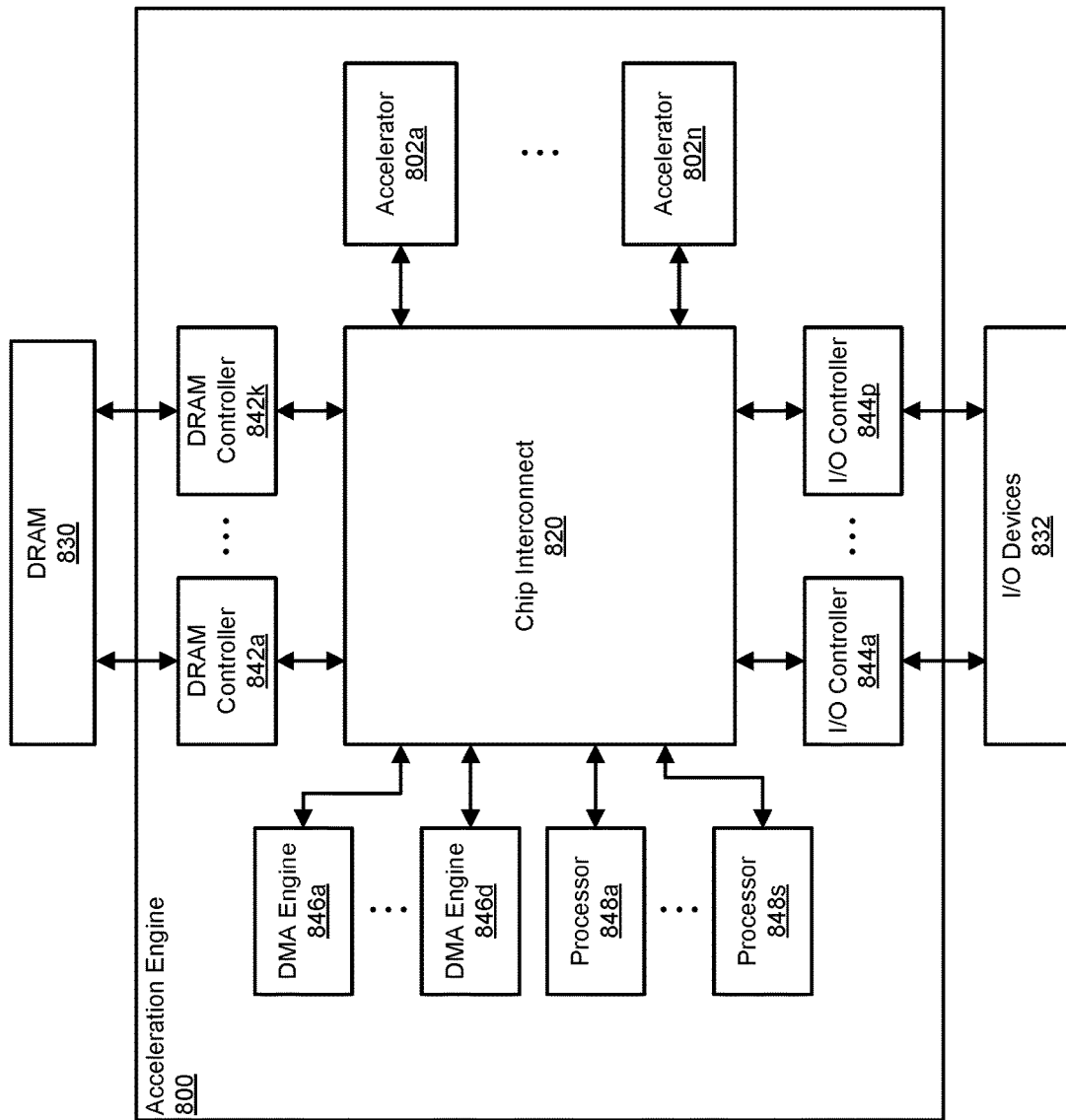
FIG. 8 includes a block diagram that illustrates an example of an acceleration engine.

FIG. 8 includes a block diagram that illustrates an example of an acceleration engine 800. The acceleration engine 800 is an example of an integrated circuit that can include one or more accelerators 802a-802n that may be similar to the accelerator illustrated in FIG. 9.

In the example of FIG. 8, the acceleration engine 800 includes multiple accelerators 802a-802n, each of which can perform a set of operations. In various examples, the accelerators 802a-802n are for particular types of operations, so that the accelerators 802a-802n can perform the operations much faster than when similar operations are performed by a general purpose processor. In various examples, to perform a set of operations, input data on which the operations are to be performed must first be moved into the accelerators 802a-802n. Additionally, in some cases, program code is also moved into the accelerators 802a-802n, which programs the operations that the accelerators 802a-802n will perform on the data. In the illustrated example, the acceleration engine 800 includes n accelerators 802a-802n. Examples of accelerators that can be included in the acceleration engine 800 include graphics accelerators, floating point accelerators, neural network accelerators, and others. In various examples, the accelerators 802a-802n can each be the same (e.g., each of the accelerators is a graphics accelerator) or can be different (e.g., the accelerators 802a-802n include a graphics accelerator, a floating point accelerator, and neural network accelerator).

The example acceleration engine 800 further includes DRAM controllers 842a-842k for communicating with an external memory. The external memory is implemented, in this example, using DRAM 830. In the illustrated example, the acceleration engine 800 includes k DRAM controllers 842a-842k, each of which may be able to communicate with an independent set of banks of DRAM. In other examples, other types of RAM technology can be used for the external memory. The DRAM controllers 842a-842k can also be referred to as memory controllers.

In various examples, input data and/or program code for the accelerators 802a-802n can be stored in the DRAM 830. Different programs can cause the accelerators 802a-802n to perform different operations. For example, when one of the accelerators is a neural network accelerator, one program can configure the neural network accelerator to perform speech recognition while another program can configure the neural network accelerator to perform image recognition. In various examples, different accelerators 802a-802n can be programmed with different programs, so that each performs a different set of operations. In various examples, the processors 848a-848s can manage moving of program code from the DRAM 830 to the accelerators 802a-802n.

The example acceleration engine 800 further includes I/O controllers 844a-844p for communicating with I/O devices 832 in the system. The acceleration engine 800 can communicate with I/O devices over, for example, a processor bus. In some examples, the processor bus can be implemented using Peripheral Component Interconnect (PCI) and/or a variation of the PCI bus protocol. The processor bus can connect the acceleration engine 800 to I/O devices such as, for example, input and output devices, memory controllers, storage devices, and/or network interface cards, among other things. In some examples, the I/O controllers 844-844p can enable the acceleration engine 800 to act as an I/O device for a host processor. For example, the acceleration engine 800 can be the recipient of input data from the host processor, and a command indicating an operation to be performed on the input data (e.g., a particular computation or analysis). In the illustrated example, the acceleration engine 800 includes p I/O controllers 844a-844p, each of which may include a separate root complex and may communicate with a separate set of I/O devices 832. In other examples, other standardized bus protocols, such as Ultra Path Interconnect (UPI) can be used for the host bus. In other examples, a proprietary bus protocol can be used.

Movement of data in the acceleration engine 800 can be managed by one or more processors 848a-848s, which can also be referred to as data management processors. In the example of FIG. 8, the acceleration engine 800 includes s processors 848a-848s incorporated into the device (e.g., on the same silicon die). In other examples, the processors 848a-848s can be external to the acceleration engine 800 (e.g., on a different die and/or in a different package). In some examples, the processors 848a-848s can manage the movement of data from I/O devices 832 to the accelerators 802a-802n or the DRAM 830. For example, input data may be located at an I/O device 832 or in processor memory, and the processors 848a-848s can move the input from the I/O device 832 or processor memory into an accelerator or into DRAM 830. As another example, program code for the accelerators 802a-802n may be located on an I/O device 832 or in processor memory.

The example acceleration engine 800 further includes DMA engines 846a-846d that can move data between the accelerators 802a-802n, DRAM controllers 842a-842k, and I/O controllers 844a-844p. In the illustrated example, the acceleration engine 800 includes d DMA engines 846a-846d. In some implementations, the DMA engines 846a-846d can be assigned to specific tasks, such as moving data from the DRAM controllers 842a-842d to the accelerators 802a-802n, or moving data between the I/O controllers 844a-844p and the accelerators 802a-802n. These tasks can be assigned, for example, by enqueueing descriptors with the DMA engines 846a-846d, where a descriptor identifies an address for a block of data and an operation (e.g., a read or a write) to perform. A descriptor, for example, can direct a DMA engine to instruct a DMA controller to read a block of data from DRAM 830. A descriptor can, as a further example, instruct the DMA engine to write data, read by the DMA controller, to an accelerator. Further descriptors can be used to move data from an accelerator to DRAM 830.

In various examples, each of the processors 848a-848s can be responsible for managing the data movement for a different accelerator. In some examples, a processor may manage the data movement for more than one accelerator.

Similarly, in various examples, each of the processors 848a-848s can be assigned to one or more DMA engines 846a-846d. In these and other examples, associations between processors 848a-848s, accelerators 802a-802n, and DMA engines 846a-846d are determined by program code being executed by each respective processor.

In the example acceleration engine 800, the various components can communicate over a chip interconnect 820. The chip interconnect 820 primarily includes wiring for routing data between the components of the acceleration engine 800. In some cases, the chip interconnect 820 can include a minimal amount of logic, such as multiplexors to control the direction of data, flip-flops for handling clock domain crossings, and timing logic.

Figure 9:
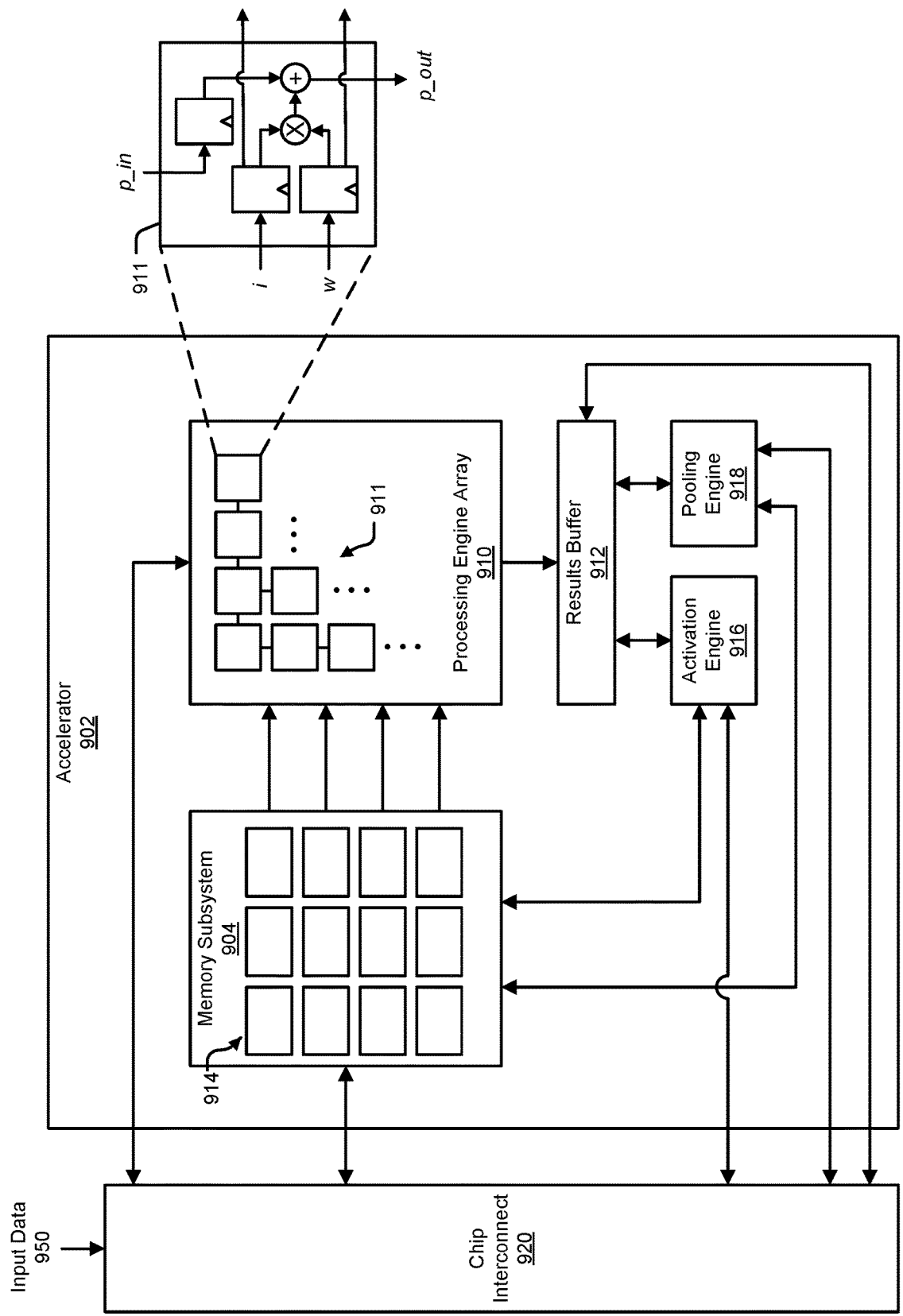
FIG. 9 includes a block diagram illustrating an example of an integrated circuit device.

FIG. 9 is a block diagram illustrating an example of an integrated circuit device. The example of FIG. 9 illustrates an accelerator 902. In various examples, the accelerator 902, for a set of input data (e.g., input data 950), can execute computations using a processing engine array 910, an activation engine 916, and/or a pooling engine 918. In some examples, the example accelerator 902 may be an integrated circuit component of a processor, such as a neural network processor. The processor may have other integrated circuit components, including additional accelerator engines.

In various implementations, the memory subsystem 904 can include multiple memory banks 914. In these implementations, each memory bank 914 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 914. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 904 can permit simultaneous access to the read or write channels of multiple memory banks. As another example, the memory subsystem 904 can include arbitration logic such that arbitration between, for example, the outputs of multiple memory banks 914 can result in more than one memory bank's output being used. In these and other examples, though globally managed by the memory subsystem 904, each memory bank can be operated independently of any other.

Having the memory banks 914 be independently accessible can increase the efficiency of the accelerator 902. For example, values can be simultaneously read and provided to each row of the processing engine array 910, so that the entire processing engine array 910 can be in use in one clock cycle. As another example, the memory banks 914 can be read at the same time that results computed by the processing engine array 910 are written to the memory subsystem 904. In contrast, a single memory may be able to service only one read or write at a time. With a single memory, multiple clock cycles can be required, for example, to read input data for each row of the processing engine array 910 before the processing engine array 910 can be started.

In various implementations, the memory subsystem 904 can be configured to simultaneously service multiple clients, including the processing engine array 910, the activation engine 916, the pooling engine 918, and any external clients that access the memory subsystem 904 over a communication fabric 920. In some implementations, being able to service multiple clients can mean that the memory subsystem 904 has at least as many memory banks as there are clients. In some cases, each row of the processing engine array 910 can count as a separate client. In some cases, each column of the processing engine array 910 can output a result, such that each column can count as a separate write client. In some cases, output from the processing engine array 910 can be written into the memory banks 914 that can then subsequently provide input data for the processing engine array 910. As another example, the activation engine 916 and the pooling engine 918 can include multiple execution channels, each of which can be separate memory clients. The memory banks 914 can be implemented, for example, using static random access memory (SRAM).

In various implementations, the memory subsystem 904 can include control logic. The control logic can, for example, keep track of the address spaces of each of the memory banks 914, identify memory banks 914 to read from or write to, and/or move data between the memory banks 914. In some implementations, memory banks 914 can be hardwired to particular clients. For example, a set of memory banks 914 can be hardwired to provide values to the rows of the processing engine array 910, with one memory bank servicing each row. As another example, a set of memory banks can be hard wired to receive values from columns of the processing engine array 910, with one memory bank receiving data for each column.

The processing engine array 910 is the computation matrix of the example accelerator 902. The processing engine array 910 can, for example, execute parallel integration, convolution, correlation, and/or matrix multiplication, among other things. The processing engine array 910 includes multiple processing engines 911, arranged in rows and columns, such that results output by one processing engine 911 can be input directly into another processing engine 911. Processing engines 911 that are not on the outside edges of the processing engine array 910 thus can receive data to operate on from other processing engines 911, rather than from the memory subsystem 904.

In various examples, the processing engine array 910 uses systolic execution, in which data arrives at each processing engine 911 from different directions at regular intervals. In some examples, input data can flow into the processing engine array 910 from the left and weight values can be loaded at the top. In some examples weights and input data can flow from the left and partial sums can flow from top to bottom. In these and other examples, a multiply-and-accumulate operation moves through the processing engine array 910 as a diagonal wave front, with data moving to the right and down across the array. Control signals can be input at the left at the same time as weights, and can flow across and down along with the computation.

In various implementations, the number of columns in the processing engine array 910 determines the computational capacity of the processing engine array 910, and the number of rows determines the required memory bandwidth for achieving maximum utilization of the processing engine array 910. The processing engine array 910 can have, for example, 64 columns and 428 rows, or some other number of columns and rows.

An example of a processing engine 911 is illustrated in FIG. 9 in an inset diagram. As illustrated by this example, a processing engine 911 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 911.

In the illustrated example, an input from above can include a partial sum, p_in, provided either from another processing engine 911 or from a previous round of computation by the processing engine array 910. When starting a computation for a new set of input data, the top row of the processing engine array 910 can receive a fixed value for p_in, such as zero. As illustrated by this example, i and w are multiplied together and the result is summed with p_in to produce a new partial sum, p_out, which can be input into another processing engine 911. Various other implementations of the processing engine 911 are possible.

Outputs from the last row in the processing engine array 910 can be temporarily stored in the results buffer 912. The results can be intermediate results, which can be written to the memory banks 914 to be provided to the processing engine array 910 for additional computation. Alternatively, the results can be final results, which, once written to the memory banks 914 can be read from the memory subsystem 904 over the communication fabric 920, to be output by the system.

In some implementations, the accelerator 902 includes an activation engine 916. In these implementations, the activation engine 916 can combine the results from the processing engine array 910 into one or more output activations. For example, for a convolutional neural network, convolutions from multiple channels can be summed to produce an output activation for a single channel. In other examples, accumulating results from one or more columns in the processing engine array 910 may be needed to produce an output activation for a single node in the neural network. In some examples, activation engine 916 can be bypassed.

In various examples, the activation engine 916 can include multiple separate execution channels. In these examples, the execution channels can correspond to the columns of the processing engine array 910, and can perform an operation on the outputs of a column, the result of which can be stored in the memory subsystem 904. In these examples, the activation engine 916 may be able to perform between 1 and n parallel computations, where n is equal to the number of columns in the processing engine array 910. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 902 can include a pooling engine 918. Pooling is the combining of outputs of the columns of the processing engine array 910. Combining can include for example, computing a maximum value, a minimum value, an average value, a median value, a summation, a multiplication, or another logical or mathematical combination. In various examples, the pooling engine 918 can include multiple execution channels that can operating on values from corresponding columns of the processing engine array 910. In these examples, the pooling engine 918 may be able to perform between 1 and n parallel computations, where n is equal to the number of columns in the processing engine array 910. In various examples, execution channels of the pooling engine 918 can operate in parallel and/or simultaneously. In some examples, the pooling engine 918 can be bypassed.

Herein, the activation engine 916 and the pooling engine 918 may be referred to collectively as execution engines. The processing engine array 910 is another example of an execution engine. Another example of an execution engine is a Direct Memory Access (DMA) engine, which may be located outside the accelerator 902.

Input data 950 can arrive over the communication fabric 920. The communication fabric 920 can connect the accelerator 902 to other components of a processor, such as a DMA engine that can obtain input data 950 from an Input/Output (I/O) device, a storage drive, or a network interface. The input data 950 can be, for example one-dimensional data, such as a character string or numerical sequence, or two-dimensional data, such as an array of pixel values for an image or frequency and amplitude values over time for an audio signal. In some examples, the input data 950 can be three-dimensional, as may be the case with, for example, the situational information used by a self-driving car or virtual reality data. In some implementations, the memory subsystem 904 can include a separate buffer for the input data 950. In some implementations, the input data 950 can be stored in the memory banks 914 when the accelerator 902 receives the input data 950.

In some examples, the accelerator 902 can implement a neural network processing engine. In these examples, the accelerator 902, for a set of input data 950, can execute a neural network to perform a task for which the neural network was trained. Executing a neural network on a set of input data can be referred to as inference or performing inference.

The weights for the neural network can be stored in the memory subsystem 904, along with input data 950 on which the neural network will operate. The neural network can also include instructions, which can program the processing engine array 910 to perform various computations on the weights and the input data. The instructions can also be stored in the memory subsystem 904, in the memory banks 914 or in a separate instruction buffer. The processing engine array 910 can output intermediate results, which represent the outputs of individual layers of the neural network. In some cases, the activation engine 916 and/or pooling engine 918 may be enabled for computations called for by certain layers of the neural network. The accelerator 902 can store the intermediate results in the memory subsystem 904 for inputting into the processing engine array 910 to compute results for the next layer of the neural network. The processing engine array 910 can further output final results from a last layer of the neural network. The final results can be stored in the memory subsystem 904 and then be copied out to host processor memory or to another location.

Figure 10:
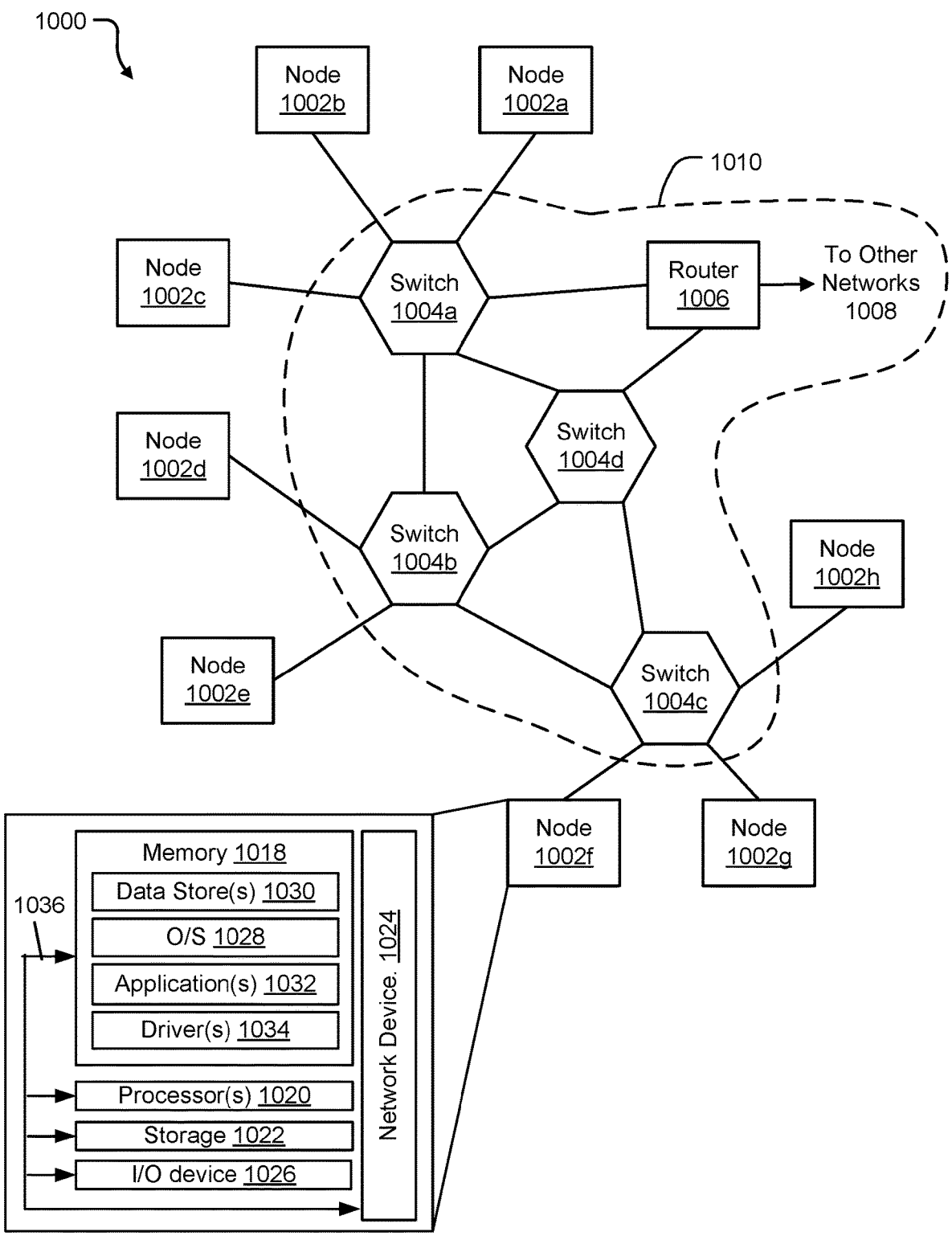
FIG. 10 includes a diagram of an example network.

FIG. 10 includes a diagram of an example network 1000, which can include one or more host systems, such as the host system illustrated in FIG. 7. For example, the example network 1000 of FIG. 10 includes multiple nodes 1002a-1002h, one or more of which can be a host system such as is illustrated in FIG. 7. Others of the nodes 1002a-1002h can be other computing devices, each of which include at least a memory for storing program instructions, a processor for executing the instructions, and a network interface for connecting to the network 1000.

In various examples, the network 1000 can be used to process data. For example, input data can be received at one of the nodes 1002a-1002h or from other networks 1008 with which the network 1000 can communicate. In this example, the input data can be directed to a node in the network 1000 that includes an acceleration engine, for the acceleration engine to operate on and produce a result. The result can then be transferred to the node or other network from which the input data was received. In various examples, input data can be accumulated from various sources, including one or more of the nodes 1002a-1002h and/or computing devices located in the other networks 1008, and the accumulated input data can be directed to one or more host systems in the network 1000. Results from the host systems can then be distributed back to the sources from which the input data was gathered.

In various examples, one or more of the nodes 1002a-1002h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 10, the nodes 1002a-1002h are connected to one another using a switched architecture with point-to point links. The switched architecture includes multiple switches 1004a-1004d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 1004a-1004d of FIG. 10 may be connected to the nodes 1002a-1002h and provide multiple paths between any two nodes.

The network 1000 may also include one or more network devices for connection with other networks 1008, such as a router 1006. Routers use headers and forwarding tables to determine the best path for forwarding the packets, and use protocols such as internet control message protocol (ICMP) to communicate with each other and configure the best route between any two devices. The router 1006 of FIG. 10 can be used to connect to other networks 1008 such as subnets, LANs, wide area networks (WANs), and/or the Internet.

In some examples, network 1000 may include any one or a combination of many different types of networks, such as cable networks, the Internet, wireless networks, cellular networks and other private and/or public networks. The interconnected switches 1004a-1004d and the router 1006, if present, may be referred to as a switch fabric 1010, a fabric, a network fabric, or simply a network. In the context of a computer network, terms "fabric" and "network" may be used interchangeably herein.

The nodes 1002a-1002h may be any combination of host systems, processor nodes, storage subsystems, and I/O chassis that represent user devices, service provider computers or third party computers.

User devices may include computing devices to access an application 1032 (e.g., a web browser or mobile device application). In some aspects, the application 1032 may be hosted, managed, and/or provided by a computing resources service or service provider. The application 1032 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1008. Additionally, the user device(s) may be part of the distributed system managed by, controlled by, or otherwise part of the service provider computer(s) (e.g., a console device integrated with the service provider computers).

The node(s) of FIG. 10 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1032 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1002a-1002h may include at least one memory 1018 and one or more processing units (or processor(s) 1020). The processor(s) 1020 may be implemented in hardware, computer-executable instructions, firmware, or combinations thereof. Computer-executable instruction or firmware implementations of the processor(s) 1020 may include computer-executable or machine-executable instructions written in any suitable programming language to perform the various functions described.

In some instances, the hardware processor(s) 1020 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1018 may store program instructions that are loadable and executable on the processor(s) 1020, as well as data generated during the execution of these programs. Depending on the configuration and type of the node(s)

1002*a*-1002*h*, the memory 1018 may be volatile (such as RAM) and/or non-volatile (such as ROM, flash memory, etc.). The memory 1018 may include an operating system 1028, one or more data stores 1030, one or more application programs 1032, one or more drivers 1034, and/or services for implementing the features disclosed herein.

The operating system 1028 may support nodes 1002*a*-1002*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1028 may also be a proprietary operating system.

The data stores 1030 may include permanent or transitory data used and/or operated on by the operating system 1028, application programs 1032, or drivers 1034. Examples of such data include web pages, video data, audio data, images, user data, and so on. The information in the data stores 1030 may, in some implementations, be provided over the network(s) 1008 to user devices. In some cases, the data stores 1030 may additionally or alternatively include stored application programs and/or drivers. Alternatively or additionally, the data stores 1030 may store standard and/or proprietary software libraries, and/or standard and/or proprietary application user interface (API) libraries. Information stored in the data stores 1030 may be machine-readable object code, source code, interpreted code, or intermediate code.

The drivers 1034 include programs that may provide communication between components in a node. For example, some drivers 1034 may provide communication between the operating system 1028 and additional storage 1022, network device 1024, and/or I/O device 1026. Alternatively or additionally, some drivers 1034 may provide communication between application programs 1032 and the operating system 1028, and/or application programs 1032 and peripheral devices accessible to the service provider computer. In many cases, the drivers 1034 may include drivers that provide well-understood functionality (e.g., printer drivers, display drivers, hard disk drivers, Solid State Device drivers). In other cases, the drivers 1034 may provide proprietary or specialized functionality.

The service provider computer(s) or servers may also include additional storage 1022, which may include removable storage and/or non-removable storage. The additional storage 1022 may include magnetic storage, optical disks, solid state disks, flash memory, and/or tape storage. The additional storage 1022 may be housed in the same chassis as the node(s) 1002*a*-1002*h* or may be in an external enclosure. The memory 1018 and/or additional storage 1022 and their associated computer-readable media may provide non-volatile storage of computer-readable instructions, data structures, program modules, and other data for the computing devices. In some implementations, the memory 1018 may include multiple different types of memory, such as SRAM, DRAM, or ROM.

The memory 1018 and the additional storage 1022, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1018 and the additional storage 1022 are examples of computer storage media. Additional types of computer storage media that may be present in the node(s) 1002*a*-1002*h* may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1002*a*-1002*h*. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1002*a*-1002*h* may also include I/O device(s) 1026, such as a keyboard, a mouse, a pen, a voice input device, a touch input device, a display, speakers, a printer, and the like. The node(s) 1002*a*-1002*h* may also include one or more communication channels 1036. A communication channel 1036 may provide a medium over which the various components of the node(s) 1002*a*-1002*h* can communicate. The communication channel or channels 1036 may take the form of a bus, a ring, a switching fabric, or a network.

The node(s) 1002*a*-1002*h* may also contain network device(s) 1024 that allow the node(s) 1002*a*-1002*h* to communicate with a stored database, another computing device or server, user terminals and/or other devices on the network(s) 1000.

In some implementations, the network device 1024 is a peripheral device, such as a PCI-based device. In these implementations, the network device 1024 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 1024 may be connected to a computing system using a PCIe interface.

A PCI-based device may include one or more functions. A "function" describes operations that may be provided by the network device 1024. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1024 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of debugging a neural network execution on a target processor, the method comprising:
   receiving, by a debugger program operating on a host system, a request to debug an execution of a neural network on the target processor, the neural network comprising a plurality of layers;
   generating, using a reference processor on the host system and based on a first sample input, a plurality of first reference tensors for the neural network;
   repeatedly reducing the plurality of layers of the neural network to produce a plurality of reduced lengths, and for each particular reduced length of the plurality of reduced lengths:
      converting, by a compiler operating on the host system, the neural network having the particular reduced length into first machine instructions;
      executing, using the target processor and based on the first sample input or on one of the plurality of first reference tensors, the first machine instructions to generate a first device tensor; and
      determining, by the debugger program, whether the first device tensor matches a first reference tensor of the plurality of first reference tensors;
   identifying a shortest length of the plurality of reduced lengths for which the first device tensor does not match the first reference tensor;

generating, using the reference processor and based on a second sample input, a plurality of second reference tensors for a representation of the neural network having the shortest length;

converting, by the compiler, the neural network having the shortest length into second machine instructions, wherein the second machine instructions includes additional instructions that enable tensor output for the representation;

executing, using the target processor and based on the second sample input or on one of the plurality of second reference tensors, the second machine instructions to generate a second device tensor for the representation; and determining, by the debugger program, whether the second device tensor matches a second reference tensor of the plurality of second reference tensors.

2. The method of claim 1, wherein the additional instructions enable tensor output for multiple representations of the neural network.

3. The method of claim 2, wherein executing the second machine instructions further generates a third device tensor for a second representation of the neural network, wherein the representation is a first representation.

4. The method of claim 3, further comprising:
determining, by the debugger program, whether the third device tensor matches a third reference tensor of the plurality of second reference tensors.

5. The method of claim 1, wherein the plurality of first reference tensors and the plurality of second reference tensors are generated by the debugger program.

6. A method of debugging a neural network execution on a target processor, the method comprising:
receiving a plurality of first reference tensors for a neural network;
repeatedly reducing a plurality of layers of the neural network to produce a plurality of reduced lengths, and for each particular reduced length of the plurality of reduced lengths:
converting, by a compiler, the neural network having the particular reduced length into first machine instructions;
executing, using the target processor, the first machine instructions to generate a first device tensor; and
determining whether the first device tensor matches a first reference tensor of the plurality of first reference tensors;
identifying a shortened length of the plurality of reduced lengths for which the first device tensor does not match the first reference tensor;
generating a plurality of second reference tensors for a representation of the neural network having the shortened length;
converting, by the compiler, the neural network having the shortened length into second machine instructions; and
executing, using the target processor, the second machine instructions to generate a second device tensor for the representation.

7. The method of claim 6, wherein the shortened length is a shortest length of the plurality of reduced lengths.

8. The method of claim 6, further comprising:
determining whether the second device tensor matches a second reference tensor of the plurality of second reference tensors.

9. The method of claim 6, wherein the second machine instructions include additional instructions that enable tensor output for the representation.

10. The method of claim 9, wherein the additional instructions enable tensor output for multiple representations of the neural network.

11. The method of claim 10, wherein executing the second machine instructions further generates a third device tensor for a second representation of the neural network, wherein the representation is a first representation.

12. The method of claim 11, further comprising:
determining whether the third device tensor matches a third reference tensor of the plurality of second reference tensors.

13. The method of claim 6, wherein the plurality of first reference tensors and the plurality of second reference tensors are generated by a debugger program.

14. A non-transitory computer-readable medium comprising instructions that, when executed by one or more processors, cause the one or more processors to perform operations including:
receiving a plurality of first reference tensors for a neural network;
repeatedly reducing a plurality of layers of the neural network to produce a plurality of reduced lengths, and for each particular reduced length of the plurality of reduced lengths:
converting, by a compiler, the neural network having the particular reduced length into first machine instructions;
executing, using a target processor, the first machine instructions to generate a first device tensor; and
determining whether the first device tensor matches a first reference tensor of the plurality of first reference tensors;
identifying a shortened length of the plurality of reduced lengths for which the first device tensor does not match the first reference tensor;
generating a plurality of second reference tensors for a representation of the neural network having the shortened length;
converting, by the compiler, the neural network having the shortened length into second machine instructions; and
executing, using a target processor, the second machine instructions to generate a second device tensor for the representation.

15. The non-transitory computer-readable medium of claim 14, wherein the shortened length is a shortest length of the plurality of reduced lengths.

16. The non-transitory computer-readable medium of claim 14, wherein the operations further comprise:
determining whether the second device tensor matches a second reference tensor of the plurality of second reference tensors.

17. The non-transitory computer-readable medium of claim 14, wherein the second machine instructions include additional instructions that enable tensor output for the representation.

18. The non-transitory computer-readable medium of claim 17, wherein the additional instructions enable tensor output for multiple representations of the neural network.

19. The non-transitory computer-readable medium of claim 18, wherein executing the second machine instructions further generates a third device tensor for a second representation of the neural network, wherein the representation is a first representation.

20. The non-transitory computer-readable medium of claim 19, wherein the operations further comprise:
   determining whether the third device tensor matches a third reference tensor of the plurality of second reference tensors.

* * * * *